(12) United States Patent
Ikeda et al.

(10) Patent No.: US 7,706,678 B2
(45) Date of Patent: Apr. 27, 2010

(54) ELECTRONIC IMAGING APPARATUS HAVING OPTICAL/ELECTRONIC FINDER MECHANISMS SWITCHABLE IN ACCORDANCE WITH IMAGING CONDITION

(75) Inventors: Yoshinori Ikeda, Tokyo (JP); Shinichi Nakajima, Tokyo (JP)

(73) Assignee: Olympus Corporation, Tokyo (JP)

( * ) Notice: Subject to any disclaimer, the term of this patent is extended or adjusted under 35 U.S.C. 154(b) by 525 days.

(21) Appl. No.: 11/398,053

(22) Filed: Apr. 5, 2006

(65) Prior Publication Data
US 2007/0019944 A1   Jan. 25, 2007

(30) Foreign Application Priority Data
Jul. 20, 2005   (JP) ............... 2005-210005

(51) Int. Cl.
  *G03B 17/20*   (2006.01)
(52) U.S. Cl. .................. 396/296; 348/341; 396/384
(58) Field of Classification Search ............. 396/296, 396/384, 373, 386; 348/341
See application file for complete search history.

(56) References Cited

U.S. PATENT DOCUMENTS

| | | | | |
|---|---|---|---|---|
| 5,848,308 | A * | 12/1998 | Kawamura | ............ 396/374 |
| 6,172,724 | B1 * | 1/2001 | Kato | ............ 349/96 |
| 6,249,650 | B1 * | 6/2001 | Iwamoto | ............ 396/271 |
| 6,549,237 | B1 * | 4/2003 | Inuma et al. | ............ 348/333.06 |
| 2001/0005232 | A1 * | 6/2001 | Yoshioka et al. | ............ 348/341 |
| 2003/0122951 | A1 * | 7/2003 | Hara et al. | ............ 348/333.02 |
| 2004/0155976 | A1 * | 8/2004 | Suda | ............ 348/345 |

FOREIGN PATENT DOCUMENTS

JP   63-164577   7/1988

OTHER PUBLICATIONS

Ichikawa, Koji: Image Pickup Device, JP Publication No. 2002-185972, Publication Date Jun. 28, 2002.*

* cited by examiner

*Primary Examiner*—Christopher E Mahoney
*Assistant Examiner*—Fang-Chi Chang
(74) *Attorney, Agent, or Firm*—Volpe and Koenig, P.C.

(57) ABSTRACT

An electronic imaging apparatus having a section for generating imaging data which indicates an imaging condition; an optical finder mechanism for introducing light from a subject to a finder; a data display device for displaying at least one of the subject's image and the imaging condition in the finder; and a switching device for switching between light incident/non-incident states for the optical finder mechanism. When imaging is not performed, the switching device makes the light incident on the optical finder mechanism. When imaging is performed and the image signal is not recorded, the switching device makes the light incident on the optical finder mechanism, and the subject's image and the image formed by the data display device are superimposed and displayed in the finder. When imaging is performed and the image signal is recorded, at least the image formed by the data display device is displayed by the switching device.

11 Claims, 4 Drawing Sheets

ELECTRONIC IMAGING APPARATUS HAVING OPTICAL/ELECTRONIC FINDER MECHANISMS SWITCHABLE IN ACCORDANCE WITH IMAGING CONDITION

BACKGROUND OF THE INVENTION

1. Field of the Invention

The present invention relates to an electronic imaging apparatus for imaging a subject and generating an image signal, and in particular, relates to an electronic imaging apparatus having a finder in which an image produced using both or a selected one of optical and electronic finder mechanisms is displayed on the same screen.

Priority is claimed on Japanese Patent Application No. 2005-210005, filed Jul. 20, 2005, the content of which is incorporated herein by reference.

2. Description of the Related Art

An electronic imaging apparatus such an electronic still camera or video camera performs photoelectric conversion of an image of a subject by using an imaging device, so as to generate an image signal. Generally, the electronic imaging apparatus has an optical finder mechanism for optically observing an image of the subject, which is generated through an imaging lens. An electronic finder mechanism may also be used for showing the image of the subject in a finder, where this image is displayed in an electronic display device based on the image signal obtained by the photoelectric conversion of the image of the subject (which is generated through the imaging lens).

The optical finder mechanism can display the image of the subject even when the imaging device is not operated, and thus is power-saving. In the optical finder mechanism, the subject's image is optically shown; thus, in comparison with the electronic finder mechanism, the color of the subject can be precisely displayed in the finder, the image can be shown with high resolution, and the focus can be adjusted more accurately.

On the other hand, the electronic finder mechanism generates a displayed image based on the signal output from the imaging device; thus, the image obtained by the imaging device can be checked during an imaging operation, and it is possible to check the image to be obtained and to display various imaging data or conditions.

Reference Document 1 (see Japanese Examined Patent Application, Second Publication No. H2-55991) discloses an electronic camera having both the optical and the electronic finder mechanisms, wherein images are shown in the finder while one of the two finder mechanisms is switchably activated.

SUMMARY OF THE INVENTION

The present invention provides an electronic imaging apparatus comprising:

an imaging device for imaging a subject and generating an image signal;

a data generating section for generating imaging data which indicates an imaging condition;

a finder for displaying an image of the subject;

an optical finder mechanism for introducing light provided from the subject to the finder, so as to optically display the subject's image in the finder;

a data display device for displaying at least one of the subject's image based on the image signal and the imaging condition based on the imaging data, in a manner such that an image of said at least one of the subject's image and the imaging condition is visibly displayed in the finder; and a state switching device for performing switching between a state in which the light provided from the subject is incident on the optical finder mechanism and a state in which the light provided from the subject is not incident on the optical finder mechanism, wherein in a first mode in which the imaging device does not perform imaging, the state switching device makes the light provided from the subject incident on the optical finder mechanism;

in a second mode in which the imaging device performs imaging and does not perform recording of the image signal, the state switching device makes the light provided from the subject incident on the optical finder mechanism, and the subject's image formed by the optical finder mechanism and the image formed by the data display device are superimposed on each other and displayed in the finder; and in a third mode in which the imaging device performs imaging, generates the image signal, and performs recording of the image signal, the state switching device performs the switching so that at least the image formed by the data display device is displayed in the finder.

In a typical example, one of a state in which all of the light provided from the subject is made incident on the imaging device, and another state, in which a portion of the light provided from the subject is made incident on the optical finder mechanism and the remaining portion is made incident on the imaging device, is selectable by the switching performed by the state switching device. Preferably, the state switching device is a semi-transparent mirror.

In a preferable example, the electronic imaging apparatus further comprises:

a zebra data generating section for generating zebra data which indicates an image area having a brightness level equal to or greater than a predetermined value, wherein in the second mode, the data display device displays a pattern based on the zebra data, and the subject's image formed by the optical finder mechanism and the pattern formed by the data display device are superimposed on each other and displayed in the finder.

In another preferable example, the electronic imaging apparatus further comprises:

a light quantity measuring section for measuring a quantity of the light incident on the imaging device, wherein in the third mode, when the quantity of light measured by the light quantity measuring section is equal to or greater than a predetermined value, the state switching device makes the light provided from the subject incident on the optical finder mechanism, and the subject's image formed by the optical finder mechanism and the image formed by the data display device are superimposed on each other and displayed in the finder.

DESCRIPTION OF THE PREFERRED EMBODIMENTS

Hereinafter, embodiments according to the present invention will be described with reference to the appended figures.

Figure 1:
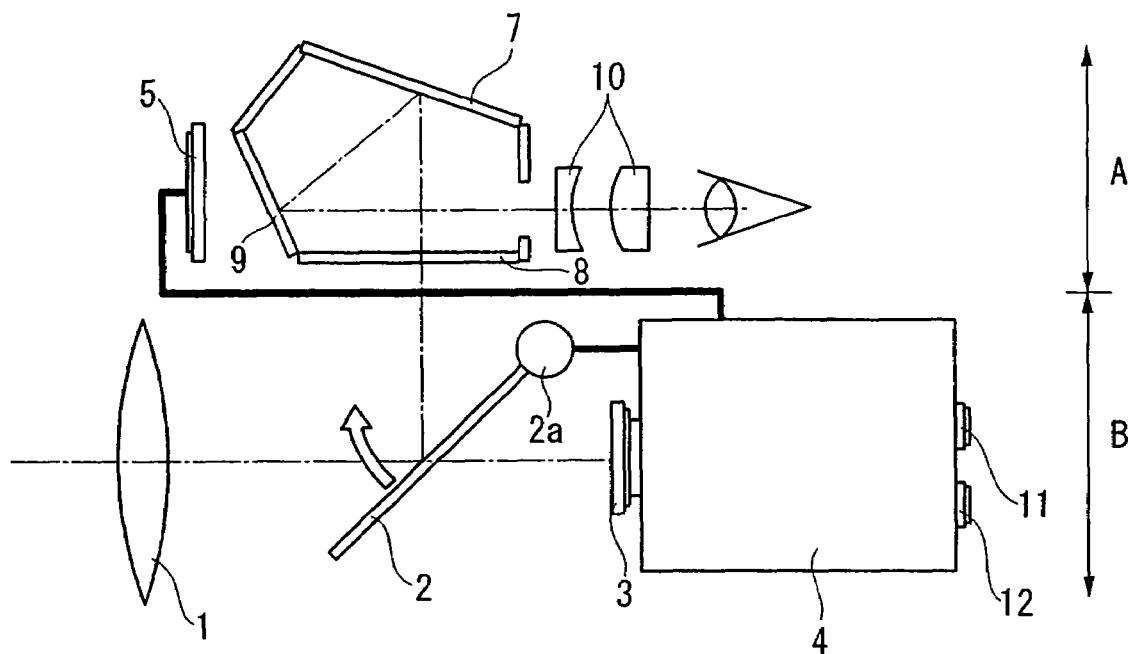
FIG. 1 is a diagram showing the structure of an electronic imaging apparatus as an embodiment in accordance with the present invention.

FIG. 1 is a diagram showing the structure of an electronic imaging apparatus as an embodiment in accordance with the present invention. The electronic imaging apparatus has a hollow penta (i.e., pentagonal) prism, and consists of a finder section which functions as a finder used by a user (or photographer) for image observation (see the upper area A in FIG. 1) and an imaging section (see the lower area B in FIG. 1).

In FIG. 1, an imaging lens 1 is shown as a single lens for convenience of illustration; however, of course, multiple lenses may be used. Light reflected by a subject is transmitted through the imaging lens 1 and is focused by the imaging lens 1 onto a position at which a solid-state image sensor (simply called the image sensor, hereinbelow) 3 is disposed. The image sensor 3 images the subject, and performs photoelectric conversion of an image of the subject (which is imaged in an imaging plane of the image sensor) so as to generate an image signal.

A semi-transparent main mirror 2 (functioning as the state switching device of the present invention) is provided between the imaging lens 1 and the image sensor 3. A mirror driving section 2a (also functioning as the state switching device of the present invention) provided at an end of the main mirror 2 supports the main mirror 2, and also has a rotation support mechanism for rotating the main mirror 2 around a rotation shaft which is vertically positioned with respect to the plane of FIG. 1. When the power source is off, the main mirror 2 has a position as shown in FIG. 1, that is, light passing straight from the imaging lens 1 to the image sensor 3 is intercepted by the main mirror 2 (while a portion of the light passes through the semi-transparent mirror 2). This state is called DOWN.

The light reflected by the main mirror 2 is imaged onto a focusing plate 8, and is incident on an eyepiece 10 via a hollow penta prism 7 and a semi-transparent penta (i.e., pentagonal) reflecting mirror 9. The eyepiece 10 is a constituent of the finder for showing an image of the subject. The subject's image, which is incident on the eyepiece 10 through the above-described route, can be optically observed through the eyepiece 10. The hollow penta prism 7, the focusing plate 8, and the semi-transparent penta reflecting mirror 9 form an optical finder mechanism for optically displaying the subject's image in the finder.

As described above, in a state (called the first mode) in which no power for driving the image sensor 3 is supplied and thus the image sensor 3 does not perform imaging, only the image generated by the optical finder mechanism is shown in the finder. In the first mode, power for the image sensor 3 is not consumed while the subject's image is observed through the finder and adjustment of the angle of view and focusing can also be performed.

When the power source is switched on, the image on the imaging plane of the image sensor 3 is converted to an electrical signal, which is sent to a signal processing section 4. The signal processing section 4 subjects the image signal generated by the image sensor 3 to various kinds of image processing. The signal processing section 4 can generate a zebra (or striped) pattern and status data for indicating imaging conditions, and generated data can be superimposed on the image signal. The zebra pattern consists of slanted lines added to an area (of an image) where brightness is saturated and which cannot be shown using a gray scale and is all white. The status data may indicate a shutter speed, a diaphragm, the position of the lens, power remaining in a battery, and a recording state of the image signal. The signal processing section 4 has an internal storage medium and also has a function of storing the image signal.

The image signal processed by the signal processing section 4 is output to an electronic display device 5 (i.e., a data display device). The electronic display device 5 has an electronic finder mechanism and is disposed behind the hollow penta prism 7 when observed from the eyepiece 10. The electronic display device 5 simultaneously displays the subject's image (based on the image signal) and the above imaging conditions (i.e., the zebra pattern (based on zebra data) and the status data) in a superimposed manner. The image generated by the electronic display device 5 is visible through the eyepiece 10.

In the finder's eyepiece 10, (i) a high-quality image generated by the optical finder mechanism which receives light reflected by the main mirror 2, and (ii) an image displayed by the electronic display device 5 which receives light transmitted through the main mirror 2 and is subjected to photoelectric conversion performed by the image sensor 3, are superimposed on each other. When the power of the electronic imaging apparatus is on and the image sensor 3 performs imaging but does not perform image recording (i.e., in a second mode), brightness or color of the image can be adjusted while observing a high-quality image, and simultaneously, an image, to which various kinds of imaging data such as the zebra pattern or the status data are added, can be observed. Here, on/off switching of the power source is performed by operating a power button 12, and on/off switching for image recording is performed by operating a recording button 11.

Figure 2:
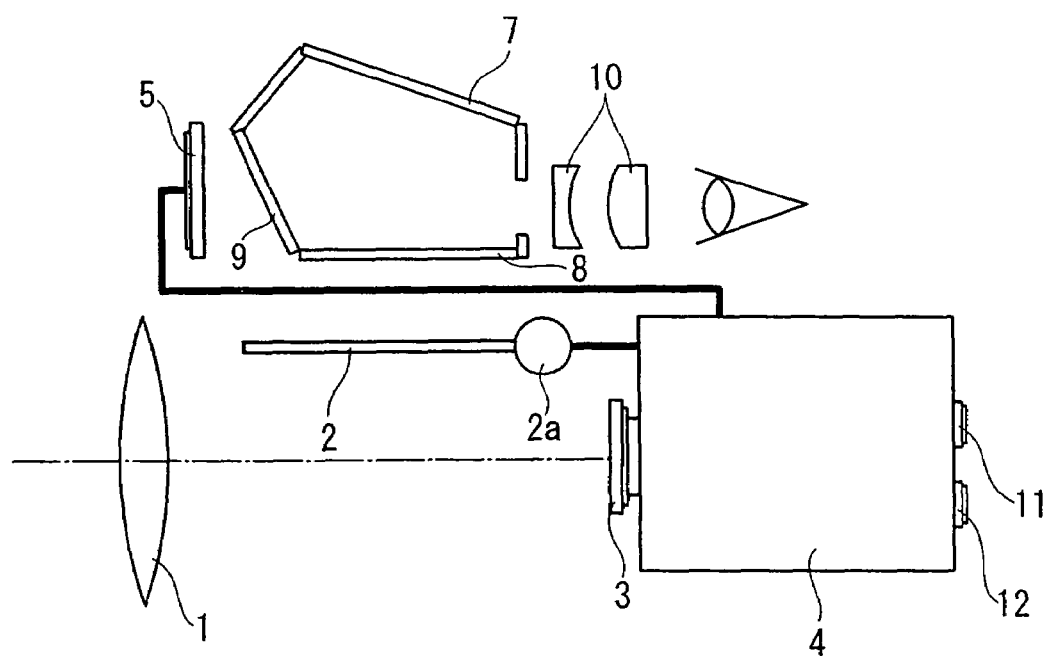
FIG. 2 is a diagram also showing the structure of the electronic imaging apparatus in the embodiment.

When the recording button 11 is pushed so as to switch the image recording state from not recording to performing recording, the mirror driving section 2a rotates the main mirror 2 to a position at which the light passing straight from the imaging lens 1 to the image sensor 3 is not intercepted by the main mirror 2 (see FIG. 2). This state is called UP. When the signal processing section 4 performs recording of the image signal generated by the image sensor 3 (i.e., in a third mode), all of the light transmitted through the imaging lens 1 is supplied to the image sensor 3. Accordingly, while image recording is performed, a preferable image obtained by the image sensor with high sensitivity of photographing can be observed.

However, even when the recording button 11 is pushed and image recording is performed, if the quantity of light incident on the image sensor 3 is equal to or greater than a specific value, control for not setting the main mirror 2 to the UP state is performed. Therefore, when the quantity of light is sufficient, the user (i.e., the photographer) can perform photographing while observing a high-quality image (obtained using the optical finder mechanism) through the eyepiece 10. When it becomes dark and the quantity of light incident on the image sensor 3 is reduced to a value less than a predetermined threshold, control for setting the main mirror 2 to the UP state is performed. In contrast, when it becomes light and the quantity of light is increased to a value equal to or greater than a predetermined threshold, control for setting the main mirror 2 to the DOWN state is performed.

In accordance with the switchable UP/DOWN state of the main mirror 2, the quantity of light incident on the image sensor 3 varies; thus, thresholds, respectively used for checking the brightness in the UP and DOWN states of the main mirror 2, are slightly adjusted in a manner such that the threshold used for checking the brightness in the DOWN state is smaller than the threshold used for checking the brightness in the UP state. If both thresholds have the same value, even when the quantity of light is less than the threshold and the main mirror 2 is switched from the DOWN to the UP state, the quantity of light increases and may exceed the threshold, thereby again setting the main mirror 2 to the DOWN state. In this case, the main mirror 2 may be alternately set to the UP and the DOWN states. In order to prevent such a pointless operation, two thresholds are appropriately set in consideration of variation in the quantity of light in accordance with the switching between the UP and the DOWN states.

Figure 3:
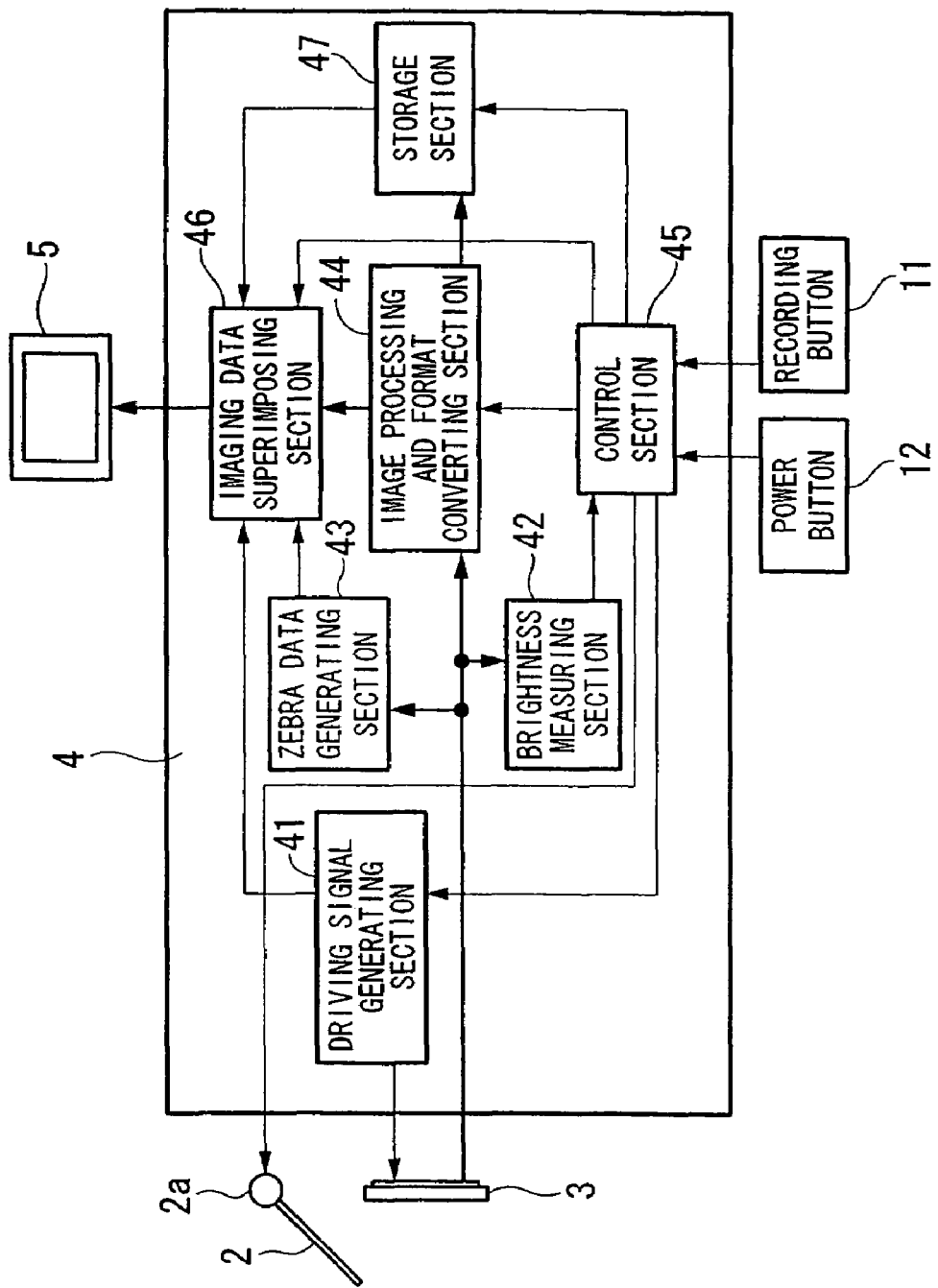
FIG. 3 is a diagram showing the structure of the signal processing section provided in the electronic imaging apparatus of the embodiment.

The structure of the signal processing section 4 will be explained. FIG. 3 shows the internal structure of the signal processing section 4. A driving signal generating section 41 for driving the image sensor 3 generates a driving signal for controlling the timing of imaging, or the like, and outputs the driving signal to the image sensor 3. The driving signal generating section 41 also outputs data of the shutter speed (as status data) to an imaging data superimposing section 46. A brightness measuring section 42 (or a light quantity measuring section) measures the quantity of light incident on the image sensor 3 by, for example, computing the sum of brightness signals of a frame with respect to the image signal output from the image sensor 3. Based on the image signal output from the image sensor 3, a zebra data generating section 43 detects an area (in the relevant image) having a brightness level higher than a predetermined value, and generates zebra data for showing a zebra pattern. The zebra data is output to the imaging data superimposing section 46.

An image processing and format converting section 44 subjects the image signal to various kinds of image processing, such as gain adjustment, gamma correction, or shading correction, and also performs conversion of the image signal to a signal having a format by which the relevant image can be displayed in the electronic display device 5. A control section 45 controls each section and performs various kinds of data processing. The imaging data superimposing section 46 superimposes various kinds of imaging data to the image signal which was subjected to image processing and format conversion performed by the image processing and format converting section 44, and outputs the image signal having the superimposed data to the electronic display device 5. As the imaging data, the driving signal generating section 41 outputs the data of the shutter speed, and the zebra data generating section 43 outputs the zebra data.

The control section 45 monitors the zooming state of the imaging lens 1, the state of the diaphragm (not shown), and power remaining in the battery, and monitored data are output to the imaging data superimposing section 46. In addition, the user can select data to be superimposed on the image signal and shown in the electronic display device 5, where data relating to the user's selection is input using an operating device (not shown) operated by the user. Based on the input data, the control section 45 outputs a superimposed data selecting signal to the imaging data superimposing section 46. Based on the superimposed data selecting signal, the imaging data superimposing section 46 selects the imaging data to be displayed, and superimposes the selected imaging data to the image signal.

A storage section 47 has a storage medium for storing the image signal, a recording circuit for storing the image signal in the storage medium, or the like. The storage section 47 outputs recording state data (as the imaging data), which indicates whether recording of the image signal is presently being performed, to the imaging data superimposing section 46.

Figure 4:
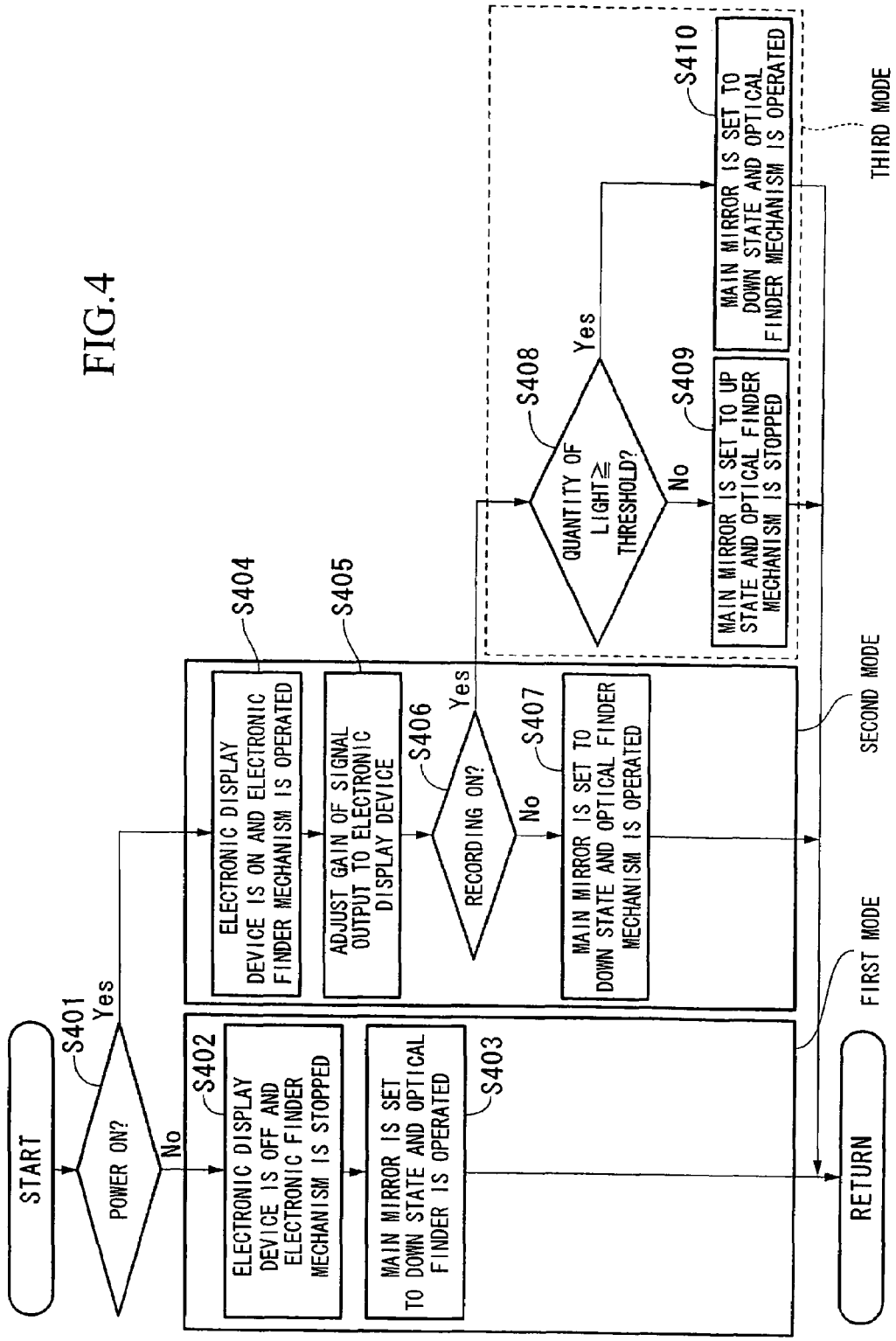
FIG. 4 is a flowchart showing the operation of the electronic imaging apparatus in the embodiment.

Below, the operation of the electronic imaging apparatus will be described with reference to FIG. 4. The electronic imaging apparatus of the present embodiment has the optical finder mechanism which can be used even when power for driving the image sensor 3 is not supplied. Therefore, the operation shown in FIG. 4 is always repeated even when no power for driving the image sensor 3 is supplied. While the power is OFF, if the power button 12 is pushed so as to turn the power ON (see "Yes" in step S401), supply of power for driving each section is started in accordance with control of the control section 45, so that imaging is started. On the other hand, while the power is ON, if the power button 12 is pushed so as to turn the power OFF (see "No" in step S401), supply of power for driving each section is stopped in accordance with control of the control section 45, so that imaging is stopped.

When turning-off of the power is commanded, power for driving the electronic display device 5 is stopped, so that electronic display of the subject's image in the finder is stopped (see step S402). The control section 45 then checks the state of the main mirror 2. When the main mirror 2 is in the UP state, the control section 45 outputs a signal for switching the state of the main mirror 2 to the DOWN state, to the mirror driving section 2a. Based on this signal, the mirror driving section 2a switches the state of the main mirror 2 to the DOWN state (see step S403). After this step, supply of power to each section is stopped. Accordingly, it is possible to observe the subject's image formed by the optical finder mechanism through the eyepiece 10. If the main mirror 2 has already been set to the DOWN state, no change in the state of the main mirror 2 occurs in step S403. The operation then returns to step S401.

On the other hand, when turning-on of the power is commanded, supply of the power to each section is started by the control of the control section 45, so that imaging is started. In addition, in accordance with the start of supply of the power to the electronic display device 5 (see step S404), display of the subject's image and the imaging data in the finder is started. The image sensor 3 performs imaging in accordance with the driving signal output from the driving signal generating section 41, and generates the image signal. The image processing and format converting section 44 performs various kinds of image processing (including gain adjustment) and format conversion, and outputs the processed image signal to the imaging data superimposing section 46. The imaging data superimposing section 46 superimposes the imaging data on the image signal, and outputs the image signal, on which the imaging data is superimposed, to the electronic display device 5. Based on the image signal, the electronic display device 5 displays an image including the subject's image and the imaging data (see step S405). If the power has already been turned ON, display operation by the electronic display device 5 is continued.

Next, the control section 45 monitors the state of the recording button 11, and determines whether image recording is ON (i.e., performed) (see step S406). When the image recording is OFF (i.e., not performed), the control section 45 checks the state of the main mirror 2. When the state of the main mirror 2 is UP, the control section 45 outputs a signal for switching the state of the main mirror 2 to the DOWN state, to the mirror driving section 2a. Based on this signal, the mirror driving section 2a switches the state of the main mirror 2 to the DOWN state (see step S407). If the main mirror 2 has already been set to the DOWN state, no change in the state of the main mirror 2 occurs in step S407. Accordingly, both (i)

the image including the subject's image and the imaging data, formed by the electronic display device 5, and (ii) an optical image of the subject, formed by the optical finder mechanism, are displayed as a superimposed image in the finder. Then the operation returns to step S401.

On the other hand, when the image recording is ON, the image signal output from the image sensor 3 is stored in the storage medium of the storage section 47. Based on the brightness of the image measured by the brightness measuring section 42, the control section 45 determines whether the quantity of light incident on the image sensor 3 is equal to or greater than a predetermined threshold (see step S408). As described above, the threshold used in this determination has different values respectively assigned for the UP state and the DOWN state of the main mirror 2.

When the quantity of light is less than the predetermined threshold, the control section 45 checks the state of the main mirror 2. When the state of the main mirror 2 is DOWN, the control section 45 outputs a signal for switching the state of the main mirror 2 to the UP state, to the mirror driving section 2a. Based on this signal, the mirror driving section 2a switches the state of the main mirror 2 to the UP state (see step S409). Accordingly, the function of the optical finder mechanism is stopped, so that only the image including the subject's image and the imaging data, formed by the electronic display device 5, is displayed in the finder. If the main mirror 2 has already been set to the UP state, no change in the state of the main mirror 2 occurs in step S409. The operation then returns to step S401.

On the other hand, when the quantity of light is equal to or larger than the predetermined threshold, the control section 45 checks the state of the main mirror 2. When the state of the main mirror 2 is UP, the control section 45 outputs a signal for switching the state of the main mirror 2 to the DOWN state, to the mirror driving section 2a. Based on this signal, the mirror driving section 2a switches the state of the main mirror 2 to the DOWN state (see step S410). Accordingly, the function of the optical finder mechanism is started, so that the image including the subject's image and the imaging data, formed by the electronic display device 5, and the subject's image formed by the optical finder are displayed in a superimposed manner in the finder. If the main mirror 2 has already been set to the DOWN state, no change in the state of the main mirror 2 occurs in step S410. The operation then returns to step S401.

Figure 5:
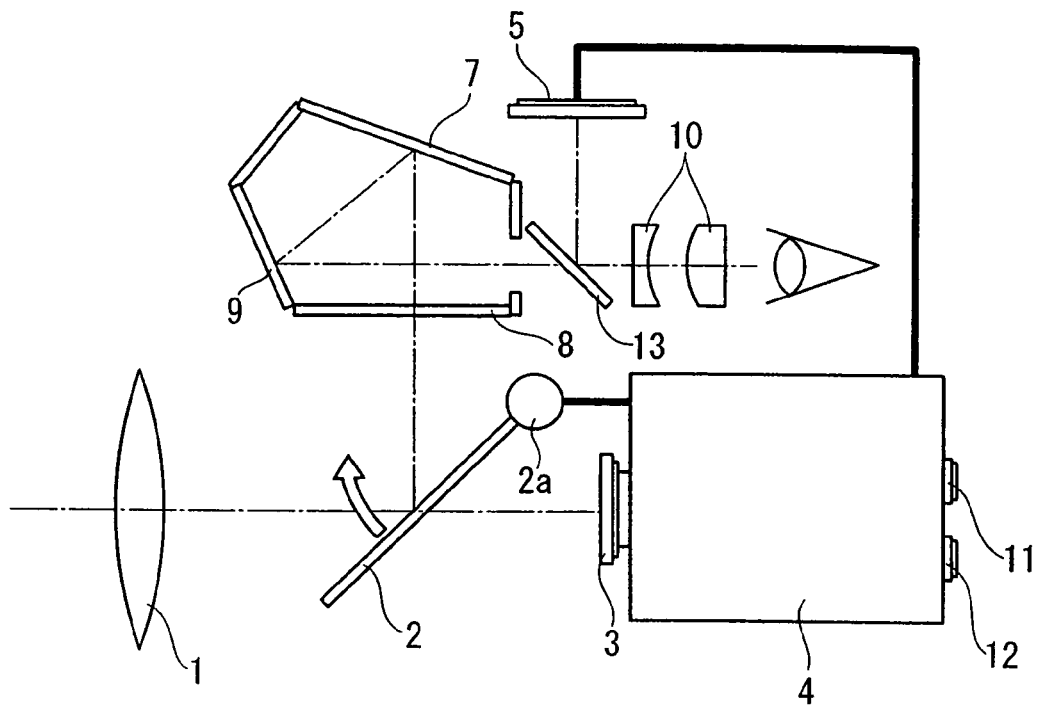
FIG. 5 is a diagram showing another example of the structure of the electronic imaging apparatus in the embodiment.

The arrangement of each section of the electronic imaging apparatus is not limited to that shown in FIG. 1. FIG. 5 shows another example of the arrangement. In comparison with FIG. 1, the electronic display device 5 is disposed at a different position in FIG. 5, more specifically, a semi-transparent mirror 13 is provided between the eyepiece 10 and the hollow penta prism 7, and the electronic display device 5 is disposed above the semi-transparent mirror 13. Accordingly, it is possible to superimpose an image supplied from the hollow penta prism 7 and an image supplied from the electronic display device 5 on each other.

Figure 6:
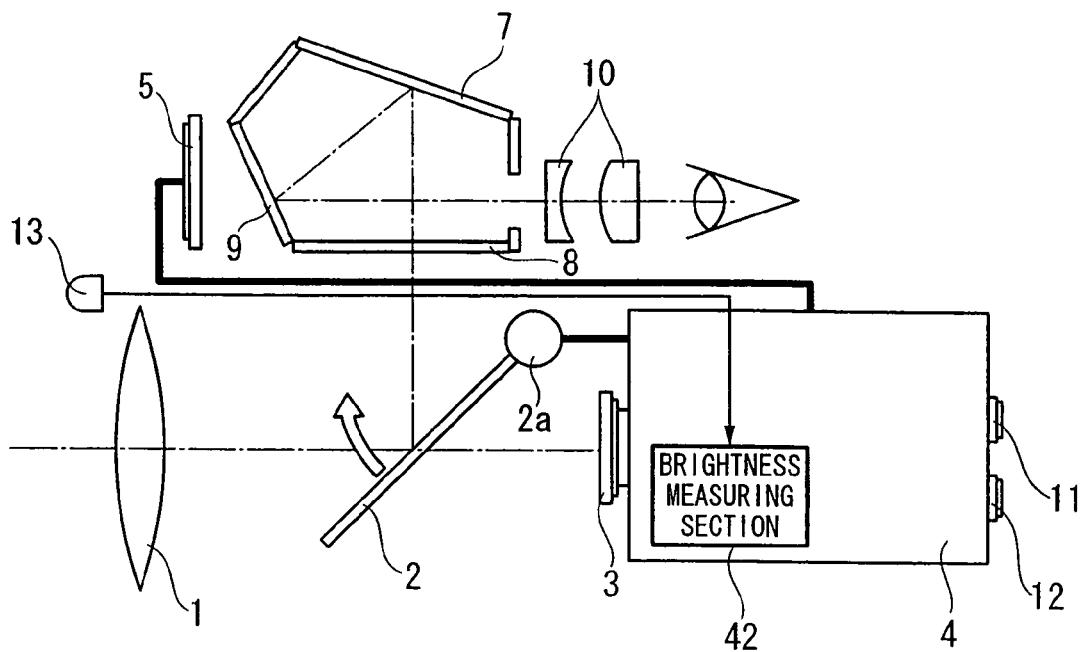
FIG. 6 is a diagram showing another example of the structure of the electronic imaging apparatus in the embodiment.

FIG. 6 shows another example of the arrangement. In comparison with FIG. 1, an optical sensor 13 is provided in the vicinity of the lens 1 in FIG. 6. The optical sensor 13 can be implemented using a photoelectric conversion element such as a photodiode. In imaging, the optical sensor 13 converts data of brightness in a peripheral area to an electrical signal, so as to send brightness data to the brightness measuring section 42 in the signal processing section 4. Accordingly, the brightness measuring section 42 measures brightness using data supplied from the optical sensor 13, without using a signal supplied by the image sensor 3. In this case, the same threshold can be assigned for both the switching from UP to DOWN and the switching from DOWN to UP. The change in the state between UP and DOWN is not influenced by the brightness data from the optical sensor 13; thus, it is unnecessary to correct the threshold as described above.

In the present embodiment, the operation mode is automatically switched in accordance with the state of the power button 12 or the recording button 11. However, an electronic display menu may be provided so as to switch the operation mode by manual operation. In addition, in the above-described second mode, the displayed image may only include the imaging data while the subject's image is not shown by the electronic display device 5. Also in the present embodiment, the storage section 47 for storing the image signal is provided in the signal processing section 4; however, the image signal may be stored in a storage device isolated from the electronic imaging apparatus.

As described above, the electronic imaging apparatus of the present embodiment has the optical and the electrical finder mechanisms, and the semi-transparent main mirror 2 and the mirror driving section 2a for switching the state between a first state in which light provided from the subject is incident on the optical finder mechanism, and a second state in which the light is not incident on the optical finder mechanism. Therefore, it is possible to display the subject's image in the same finder while the electrical and the optical finder mechanisms are switchably used in accordance with imaging conditions or the like. Accordingly, imaging can be performed while automatically setting appropriate conditions in accordance with the environment for imaging, and operation states of the electronic imaging apparatus.

In the above-described first mode, the image sensor 3 does not perform imaging, and light provided from the subject is reflected by the main mirror 2 and is incident on the optical finder mechanism. In this state, the subject's image formed by the optical finder mechanism is displayed in the finder; thus, it is possible to adjust the angle of view and perform focusing with high accuracy while checking the displayed image having high resolution. Additionally, in this state in which the image sensor 3 does not perform imaging, power consumption of the electronic imaging apparatus can be reduced. In particular, in the first mode of the present embodiment, power for driving the image sensor 3 is not supplied; thus, the power consumption of the electronic imaging apparatus can be further reduced.

In the above-described second mode, the image sensor 3 performs imaging, thereby generating the image signal. Simultaneously, (a portion of) light provided from the subject is reflected by the main mirror 2 and is incident on the optical finder mechanism. In this state, the subject's image formed by the optical finder mechanism and the image (i.e., including at least one of the subject's image and the imaging data) formed by the electronic display device 5 are displayed in the same finder in a superimposed manner. In accordance with the displayed subject's image formed by the optical finder mechanism, the angle of view and the focus can be adjusted with high accuracy while observing the image having high resolution, similarly to in the first mode. The quantity of light incident on the image sensor 3 depends on transmittance of the main mirror 2; thus, it is possible to also adjust the diaphragm by referring to the image signal output from the image sensor 3.

In addition, the imaging data is displayed in the finder; thus, imaging conditions can be set while checking the displayed imaging data. For example, when a zebra pattern is displayed in the finder, it is possible to easily set conditions such as a diaphragm for deciding the quantity of incident light, while checking the image in the finder.

In the above-described third mode, the image signal generated by the image sensor 3 is stored in the storage medium in the storage section 47. When the quantity of light incident on the image sensor 3 is less than a predetermined value, light provided from the subject is not incident on the optical finder mechanism, and only the image formed by the electronic display device 5 is displayed in the finder. In this state, all of the light beam incident from the subject to the imaging lens 1 is incident on the imaging plane of the image sensor 3, thereby storing an image signal having high sensitivity. In addition, an accurate signal level of the stored image signal can be obtained; thus, the diaphragm can be adjusted with high accuracy.

In the third mode, when the quantity of light incident on the image sensor 3 is equal to or greater than the predetermined value, the subject's image formed by the optical finder mechanism and the image formed by the electronic display device 5 are superimposed on each other, and displayed in the same finder. When the quantity of light incident on the image sensor 3 is sufficiently large, the image signal has sufficient sensitivity without making all of the light beam (incident from the subject to the imaging lens 1) incident on the image sensor 3. Therefore, recording of the image signal can be performed while checking the subject's image having high resolution, formed by the optical finder mechanism.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In accordance with the present invention, one of the electrical finder mechanism using the imaging device and the optical finder mechanism can be switchably used so as to display a subject's image in the same finder, in accordance with imaging states or the like. In addition, in the first mode, the subject's image formed by the optical finder mechanism is displayed in the finder; thus, the angle of view and the focus can be adjusted with high accuracy while checking the subject's image having high resolution. In addition, the imaging device does not perform imaging; thus, power consumption of the electronic imaging apparatus can be reduced.

Also in the second mode, the subject's image formed by the optical finder mechanism is displayed in the finder. Therefore, similarly to in the first mode, the angle of view and the focus can be adjusted with high accuracy while checking the subject's image having high resolution. In this process, the imaging data is simultaneously displayed; thus, imaging conditions can be set while checking the imaging data.

In the third mode in which the imaging device performs recording of the generated image signal, when the quantity of light incident on the imaging device is less than the predetermined value, all the light beam supplied from the subject can be incident on the imaging device, so that an image signal having high sensitivity can be stored.

What is claimed is:

1. An electronic imaging apparatus comprising:
   an imaging device for imaging a subject through an imaging lens and generating an image signal;
   a data generating section for generating imaging data which indicates an individual imaging condition of the subject;
   a finder for displaying an image of the subject so that the subject's image is visible through an eyepiece having an optical axis distant from an optical axis of the imaging lens by a predetermined distance;
   an optical finder mechanism that has a hollow penta prism and introduces light provided from the subject to the finder, so as to optically display the subject's image in the finder;
   a data display device configured to display the subject's image in the finder based on the image signal, the data display device forming and displaying an image which includes one or both of the subject's image based on the image signal and the imaging data; and
   a state switching device for performing switching between a state in which the light provided from the subject is incident on the optical finder mechanism and a state in which the light provided from the subject is not incident on the optical finder mechanism,
   wherein in a first mode in which the imaging device does not perform imaging, the state switching device enables light from the subject to be incident on the optical finder mechanism;
   in a second mode in which the imaging device performs imaging and does not perform recording of the image signal, the state switching device enables light from the subject to be incident on the optical finder mechanism, and the subject's image formed by the optical finder mechanism and the image formed by the data display device are superimposed on each other and displayed in the finder; and
   in a third mode in which the imaging device performs imaging, generates the image signal, and performs recording of the image signal, the state switching device performs the switching so that at least the image formed by the data display device is displayed in the finder.

2. The electronic imaging apparatus in accordance with claim 1, wherein one of a state in which all of the light provided from the subject is made incident on the imaging device, and another state, in which a portion of the light provided from the subject is made incident on the optical finder mechanism and the remaining portion is made incident on the imaging device, is selectable by the switching performed by the state switching device.

3. The electronic imaging apparatus in accordance with claim 2, wherein the state switching device is a semi-transparent mirror.

4. The electronic imaging apparatus in accordance with claim 1, further comprising:
   a zebra data generating section for generating zebra data which indicates an image area having a brightness level equal to or greater than a predetermined value,
   wherein in the second mode, the data display device displays a pattern, which is based on the zebra data, as the imaging data, and the subject's image formed by the optical finder mechanism and the pattern formed by the data display device are superimposed on each other and displayed in the finder.

5. The electronic imaging apparatus in accordance with claim 1, further comprising:
   a light quantity measuring section for measuring a quantity of the light incident on the imaging device,
   wherein in the third mode, when the quantity of light measured by the light quantity measuring section is equal to or greater than a predetermined value, the state switching device makes the light provided from the subject incident on the optical finder mechanism, and the subject's image formed by the optical finder mechanism and the image formed by the data display device are superimposed on each other and displayed in the finder.

6. The electronic imaging apparatus in accordance with claim 5, wherein the predetermined value is different between the state in which the light provided from the subject is incident on the optical finder mechanism and the state in which the light provided from the subject is not incident on the optical finder mechanism.

7. The electronic imaging apparatus in accordance with claim 5, wherein:
the light quantity measuring section is an optical sensor provided in the vicinity of an imaging lens; and
the predetermined value is not changed between the state in which the light provided from the subject is incident on the optical finder mechanism and the state in which the light provided from the subject is not incident on the optical finder mechanism.

8. An electronic imaging apparatus comprising:
an imaging device for imaging a subject through an imaging lens and generating an image signal;
a data generating section for generating imaging data which indicates an imaging condition of the subject;
a finder for displaying an image of the subject so that the subject's image is visible through an eyepiece having an optical axis distant from an optical axis of the imaging lens by a predetermined distance;
an optical finder mechanism that has a hollow penta prism and introduces light provided from the subject to the finder, to optically display the subject's image in the finder; and
a data display device configured to display the subject's image responsive to the image signal and positioned to enable the image to be viewed through said finder;
wherein the optical finder mechanism is configured to enable simultaneous viewing of the optical image and the image displayed by the display device.

9. The imaging apparatus of claim 8 wherein the image displayed by the data display device is superimposed on the optical image.

10. The imaging apparatus of claim 8 further comprising:
a switching device for performing switching between a state in which light from the subject can be viewed through the optical finder and a state in which the light from the subject is prevented from being viewed through the optical finder.

11. The imaging apparatus of claim 10, wherein,
in a first mode in which the imaging device does not perform imaging, the switching device permits light provided from the subject to be viewed through the optical finder mechanism;
in a second mode in which the imaging device performs imaging and maintains a recording device in an off state to prevent recording of the image signal, the switching device permits light from the subject to be viewed through the optical finder, and the optical image formed by the optical finder mechanism and the image formed by the data display device are superimposed on each other for simultaneous viewing through the optical finder; and
in a third mode, in which the imaging device performs imaging, generates the image signal, and recording of the image signal is performed, the switching device permits at least the image formed by the data display device to be viewed through the finder.

* * * * *